(12) United States Patent
Nishi

(10) Patent No.: US 9,920,682 B2
(45) Date of Patent: Mar. 20, 2018

(54) WATER-TEMPERATURE-SENSOR BACKUP SYSTEM

(71) Applicant: HINO MOTORS, LTD., Hino (JP)

(72) Inventor: Takayuki Nishi, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 173 days.

(21) Appl. No.: 14/649,345

(22) PCT Filed: Nov. 27, 2013

(86) PCT No.: PCT/JP2013/006953
§ 371 (c)(1),
(2) Date: Jun. 3, 2015

(87) PCT Pub. No.: WO2014/091695
PCT Pub. Date: Jun. 9, 2014

(65) Prior Publication Data
US 2016/0017789 A1    Jan. 21, 2016

(30) Foreign Application Priority Data

Dec. 13, 2012   (JP) .................................. 2012-272190

(51) Int. Cl.
*G01M 17/00* (2006.01)
*F01P 11/16* (2006.01)
(Continued)

(52) U.S. Cl.
CPC ................ *F01P 11/16* (2013.01); *F01P 3/20* (2013.01); *F01P 7/16* (2013.01); *F02D 41/222* (2013.01);
(Continued)

(58) Field of Classification Search
CPC ...... F01P 11/16; F01P 3/20; F01P 7/16; F02D 2200/021; F02D 2400/08; F02D 41/222;
(Continued)

(56) References Cited

U.S. PATENT DOCUMENTS 4,274,381 A  *  6/1981  Abo ...................... F02D 41/222
                                                    123/479
4,493,304 A  *  1/1985  Nakajima ................ F01P 11/14
                                                    123/479
(Continued)

FOREIGN PATENT DOCUMENTS

JP       2004-523735 A      8/2004
JP       2007-162775 A      6/2007
(Continued)

OTHER PUBLICATIONS

International Search Report dated Mar. 4, 2014 in PCT/JP2013/006953 filed Nov. 27, 2013.

*Primary Examiner* — Hung Q Nguyen
*Assistant Examiner* — Tea Holbrook
(74) *Attorney, Agent, or Firm* — Oblon, McClelland, Maier & Neustadt, L.L.P.

(57) ABSTRACT

Water-temperature sensors for detection of temperature of cooling water 12 having passed through an engine 1 are increased in number into two (18 and 19). A controller 20 is provided to confirm that each of detection values of the water-temperature sensors 18 and 19 is within a normal range and then employ either of the detection values as temperature of the cooling water 12. The controller 20 is configured such that, when either of the detection values of the water-temperature sensors 18 and 19 is out of the normal range, the remaining detection value within the normal range is employed as temperature of the cooling water 12.

2 Claims, 3 Drawing Sheets

(51) Int. Cl.
    *F02D 41/22*  (2006.01)
    *F01P 3/20*   (2006.01)
    *F01P 7/16*   (2006.01)
    *G01K 13/02*  (2006.01)

(52) U.S. Cl.
    CPC ........ G01K 13/02 (2013.01); *F02D 2200/021* (2013.01); *F02D 2400/08* (2013.01); *G01K 2013/026* (2013.01); *Y02T 10/40* (2013.01)

(58) Field of Classification Search
    CPC .. G01K 13/02; G01K 2013/026; G01K 15/00; G01K 15/007; G01K 17/08; G01K 2201/02; G01K 2205/00; G01K 7/42; Y02T 10/40; F02M 26/49; G01L 27/007; G01D 3/08; G01M 15/048
    See application file for complete search history.

(56) References Cited

U.S. PATENT DOCUMENTS

| | | | | |
|---|---|---|---|---|
| 4,556,029 | A * | 12/1985 | Yamaguchi | F01P 11/16 123/179.15 |
| 4,665,882 | A * | 5/1987 | Otobe | F02D 41/0077 123/568.16 |
| 4,780,826 | A * | 10/1988 | Nakano | F02D 41/222 123/479 |
| 5,544,639 | A * | 8/1996 | Shouda | F01N 9/005 123/676 |
| 6,421,625 | B1 * | 7/2002 | Cianciara | G01D 3/08 123/41.15 |
| 6,556,939 | B1 | 4/2003 | Wegerich | |
| 6,606,898 | B1 * | 8/2003 | Abe | G01M 15/102 73/23.31 |
| 6,679,110 | B2 * | 1/2004 | Oka | F01P 11/16 73/114.68 |
| 6,804,601 | B2 * | 10/2004 | Wang | F02D 41/222 60/602 |
| 6,830,027 | B1 * | 12/2004 | Segawa | F02D 41/0087 123/198 F |
| 2003/0158694 | A1 | 8/2003 | Wegerich | |
| 2004/0164559 | A1 * | 8/2004 | Shinogi | F01N 11/007 290/40 B |
| 2004/0262411 | A1 * | 12/2004 | Tsukamoto | F01P 11/16 236/101 C |
| 2005/0137780 | A1 * | 6/2005 | Gosho | F02D 41/064 701/113 |
| 2007/0062499 | A1 * | 3/2007 | Miyasako | F02B 77/082 123/568.16 |
| 2007/0295650 | A1 * | 12/2007 | Yoneda | B01D 61/025 210/97 |
| 2008/0176121 | A1 * | 7/2008 | Yamamiya | H01M 8/04216 429/421 |
| 2010/0182809 | A1 * | 7/2010 | Cullinane | H02P 9/02 363/34 |
| 2012/0117954 | A1 * | 5/2012 | Yasui | F01N 3/208 60/301 |
| 2012/0174576 | A1 * | 7/2012 | Vigild | F02B 29/0468 60/599 |
| 2012/0174578 | A1 * | 7/2012 | Vigild | F02B 29/0475 60/602 |
| 2013/0058373 | A1 * | 3/2013 | Sakurada | F02D 41/222 374/4 |
| 2013/0213324 | A1 | 8/2013 | Saitoh | |
| 2013/0253758 | A1 * | 9/2013 | Nishi | F01P 11/16 701/30.5 |
| 2014/0123918 | A1 * | 5/2014 | Nethercutt | F01P 7/16 123/41.08 |

FOREIGN PATENT DOCUMENTS

| | | |
|---|---|---|
| JP | 2012-102687 A | 5/2012 |
| KR | 20020045854 A * | 6/2002 |

* cited by examiner

WATER-TEMPERATURE-SENSOR BACKUP SYSTEM

TECHNICAL FIELD

The present invention relates to a water-temperature-sensor backup system.

BACKGROUND ART

Generally, most of various devices for countermeasure on exhaust gas in an automobile normally operate in a condition of an engine being sufficiently warm. With respect to, for example, a so-called EGR device in which part of exhaust gas extracted from an exhaust side is cooled by an EGR cooler and is returned to an intake side, the exhaust gas returned to the intake side suppressing combustion of fuel in an engine to lower a combustion temperature to thereby reduce generation of $NO_x$, control is conducted in a condition of the cold engine at cold start thereof (cold condition) such that warming of the engine is prioritized with recirculation of the exhaust gas being stopped. Whether the engine becomes sufficiently warm or not is determined by detecting a temperature of cooling water having passed through the engine by a water-temperature sensor.

Further, monitored is whether the detection value of the water-temperature sensor is within a normal range or not. When the detection value becomes out of the normal range into a value impossible in normal use, abnormality of the water-temperature sensor is determined to reject the detection value of the water-temperature sensor and temporarily employ a fixed substitute value while stopped is a device operating in dependence upon a temperature of cooling water such as an EGR device for recirculation of exhaust gas.

Explanation is made on, for example, an EGR device. If recirculation of exhaust gas were started to an unwarmed engine still in cold, low-temperature exhaust gas having passed through an EGR cooler would be introduced into the cold engine, resulting in generation of while smoke. Thus, taken is action of stopping the EGR device so far as the water-temperature sensor is indicative of abnormality.

Stopping action is similarly taken on a device other than the EGR device which operates in dependence upon a temperature of cooling water since the device cannot normally operate in such condition; with respect to specifically trouble-free control, a fixed substitute value is temporarily applied as temperature of the cooling water to continue the control.

There exists, for example, the following Patent Literature 1 as conventional art document pertinent to such determination of abnormality on a water-temperature sensor.

CITATION LIST

Patent Literature

Patent Literature 1: JP 2012-102687A

SUMMARY OF INVENTION

Technical Problems

However, it is a conventional problem that, once abnormality of the water-temperature sensor is determined, an EGR device or other device has to be stopped and becomes not operable normally until the abnormality of the water-temperature sensor is released by replacement, repair or the like.

The invention was made in view of the above and has its object to provide a backup system for a water-temperature sensor which can grasp a temperature of cooling water continuously even if the water-temperature sensor becomes abnormal.

Solution to Problems

The invention is directed to a water-temperature-sensor backup system characterized in that water-temperature sensors for detecting a temperature of cooling water having passed through an engine are increased in number into two, and a controller is provided which confirms that each of detection values of said water-temperature sensors is within a normal range and then employs either of the detection values as temperature of the cooling water, said controller being configured such that even if either of the detection values of the water-temperature sensors is out of the normal range, the remaining detection value within the normal range is employed as temperature of the cooling water.

Thus, if each of the detection values of the water-temperature sensors is within the normal range, both of the water-temperature sensors may be regarded normal, so that either of the detection values can be employed, with causing no trouble, as temperature of the cooling water to continue the control. If either of the detection values is a value out of the normal range and impossible in normal use, then the water-temperature sensor outputting such detection value is regarded abnormal, so that for the control the remaining detection value within the normal range can be employed as temperature of the cooling water to continue the control with causing no trouble.

Further, it is preferable in the invention that the controller is configured such that if both of the detection values of the water-temperature sensors are out of the normal range, a fixed substitute value is employed as temperature of the cooling water and a device causing any trouble by use of the substitute value is selectively stopped.

In such a case where both of the detection values of the water-temperature sensors are out of the normal range, both of the water-temperature sensors are regarded abnormal so that both of the detection values are rejected and the fixed substitute value is employed as temperature of the cooling water while the device causing any trouble by use of said substitute value is selectively stopped.

Further, it is preferable in the invention that the controller is configured such that, if each of the detection values of the water-temperature sensors is within the normal range and a deflection between said detection values exceeds an allowable value, then a fixed substitute value is employed as temperature of the cooling water and a device causing any trouble by use of said substitute value is selectively stopped.

In such a case where each of the detection values of the water-temperature sensors is within the normal range and the deflection between said detection values exceeds the predetermined allowable value, either of the water-temperature sensors is regarded abnormal in characteristic so that both of the detection values are rejected and a fixed substitute value is employed as temperature of the cooling water while the device causing any trouble by use of said substitute value are selectively stopped.

Advantageous Effects of Invention

A water-temperature-sensor backup system according to the invention mentioned above can exhibit various excellent effects and advantages as follows:

(I) If one of the water-temperature sensors becomes abnormal, the other water-temperature sensor can make backup to continuously grasp a temperature of cooling water, so that control based on the temperature of the cooling water can be continued with causing no trouble, and thus an EGR device or other device can be operated normally for a long time until both of the water-temperature sensors become abnormal.

(II) A controller may be configured such that, when both of detection values of the water-temperature sensors are out of the normal range, a fixed substitute value is employed as temperature of the cooling water and a device causing any trouble by use of said substitute value is selectively stopped. Then, when both of the water-temperature sensors become abnormal, the fixed substitute value can be employed as temperature of the cooling water to continue control specifically causing no trouble, and any troubles due to malfunctions of the device operating depending upon the temperature of the cooling water can be preliminarily prevented.

(III) The controller may be configured such that, if each of the detection values of the water-temperature sensors is within the normal range and the deflection between said detection values exceeds the predetermined allowable value, then the fixed substitute value is employed as temperature of the cooling water and the device causing any trouble by use of said substitute value is selectively stopped, which makes it possible to detect any characteristic abnormality of either of the water-temperature sensors even if both of the detection values of the water-temperature sensors are within the normal range. When such characteristic abnormality is detected, the fixed substitute value can be employed as temperature of the cooling water to continue control specifically causing no trouble, and any troubles due to malfunctions of the device operating depending upon the temperature of the cooling water can be preliminarily prevented.

DESCRIPTION OF EMBODIMENT

Next, an embodiment of the invention will be described in conjunction with the drawings.

Figure 1:
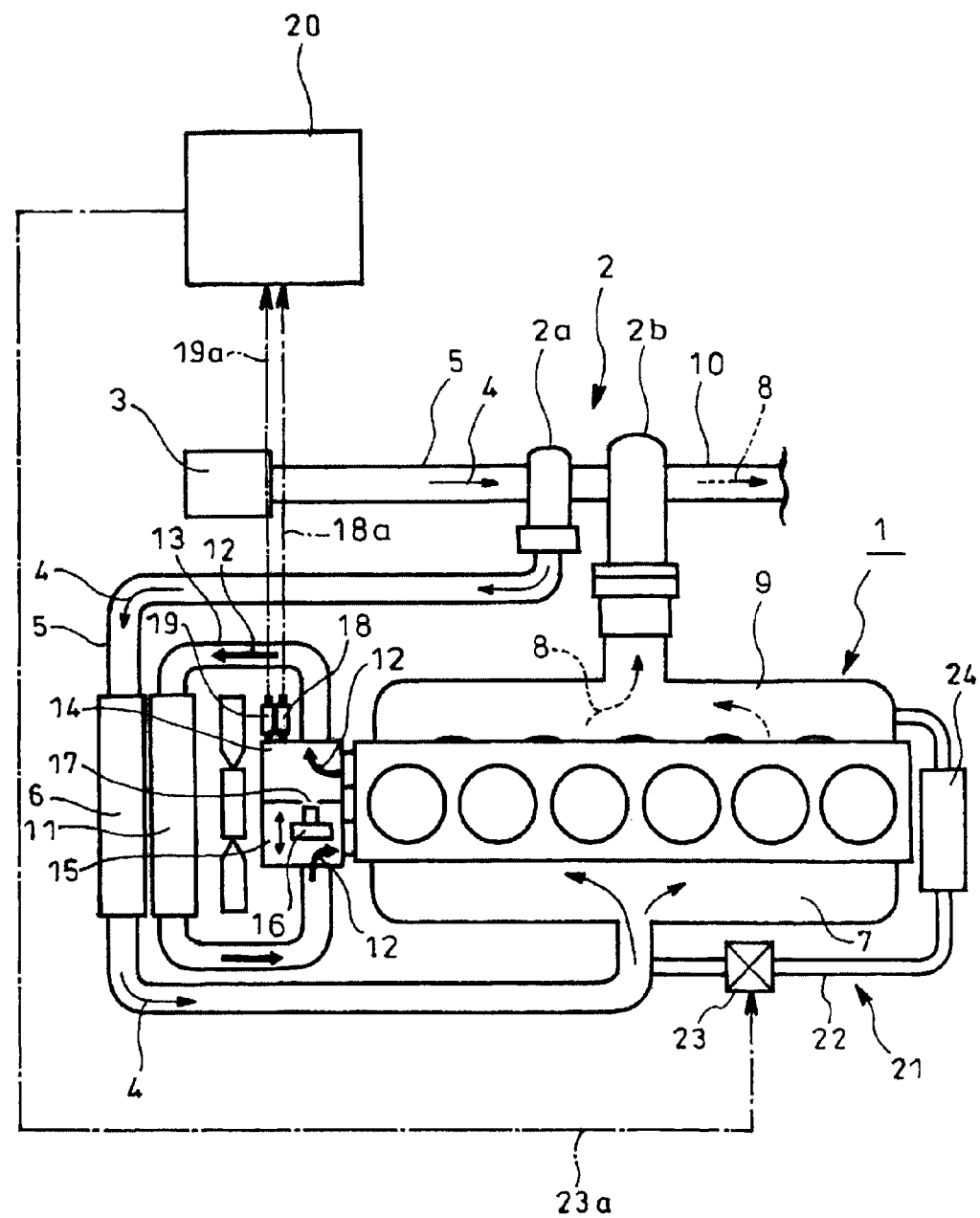
FIG. 1 is a schematic view showing an embodiment of the invention.
Figure 2:
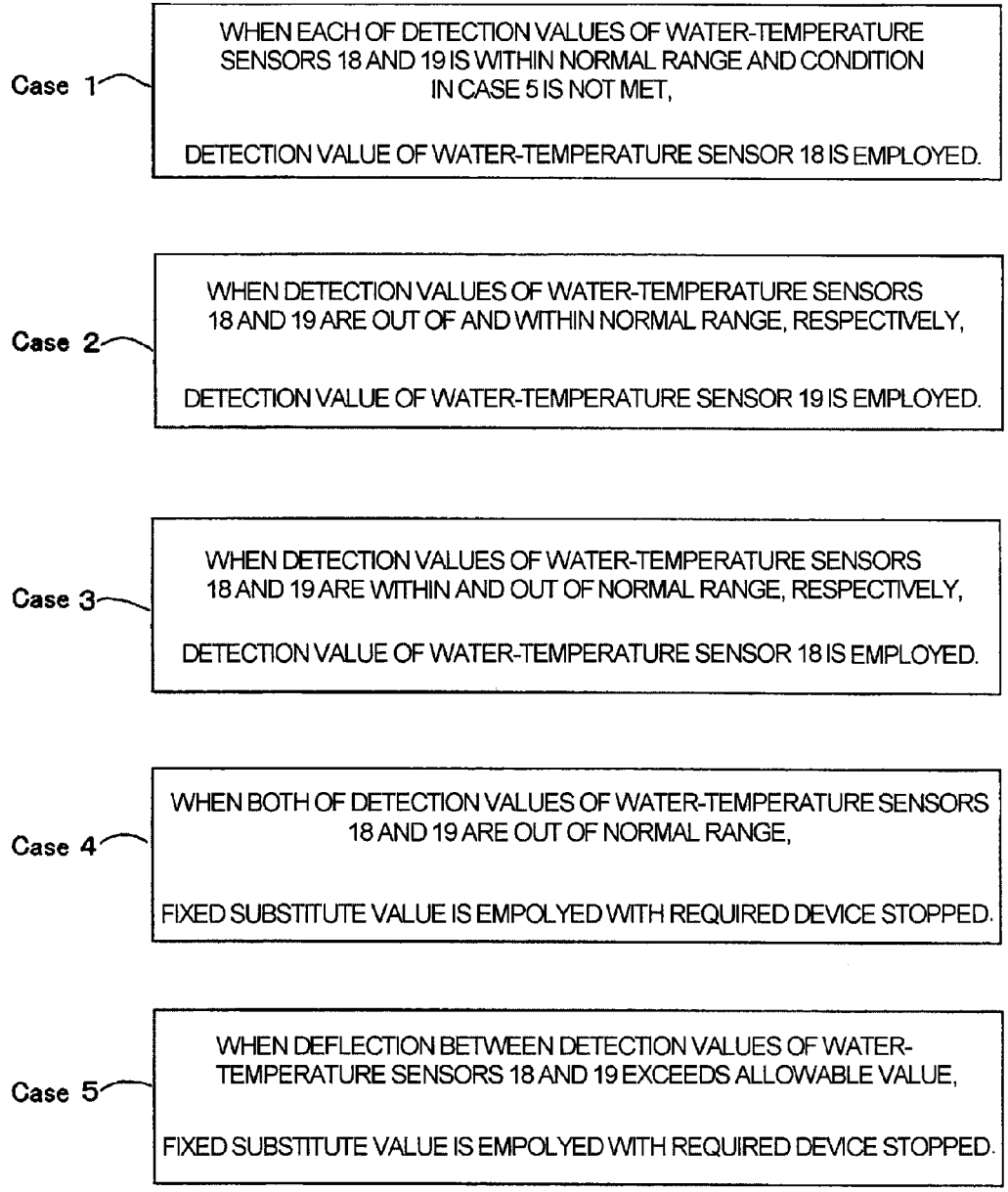
FIG. 2 is a block diagram showing five determinations in the controller in FIG. 1.
Figure 3:
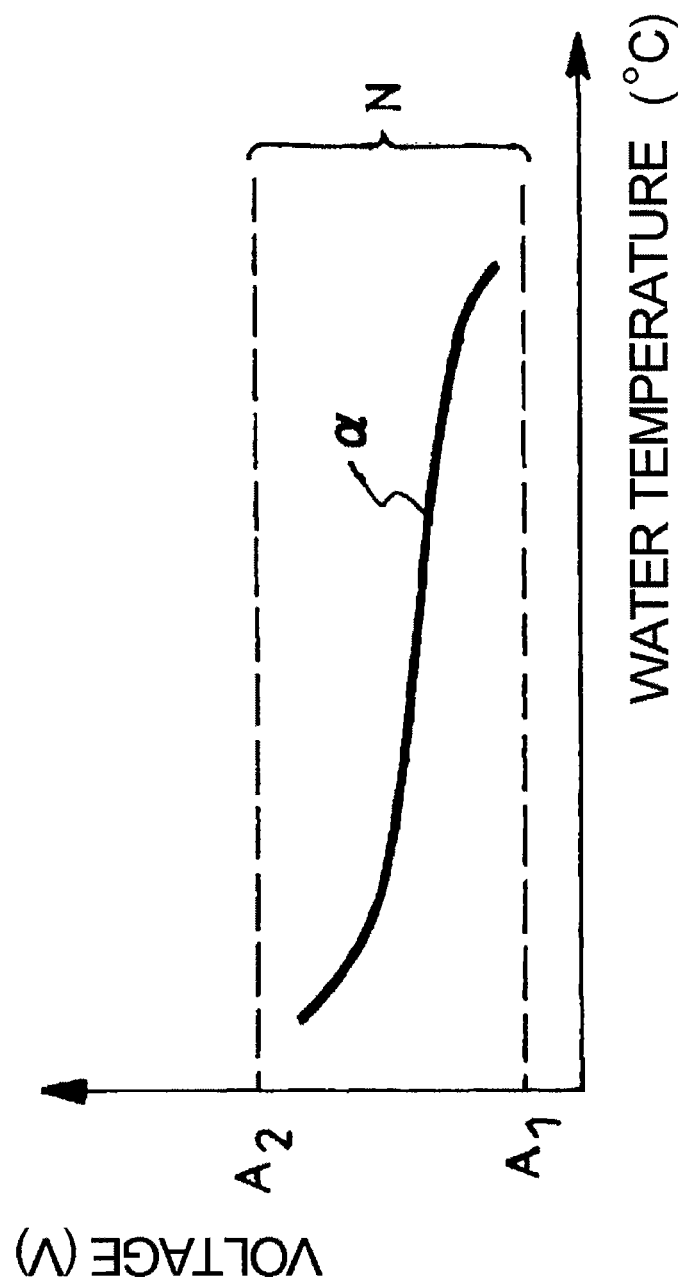
FIG. 3 is a graph showing a relationship between a signal voltage of a water-temperature sensor and water temperature.

FIGS. 1-3 show the embodiment of the invention. In FIG. 1, reference numeral 1 denotes an engine which is a diesel engine. The engine 1 has a turbocharger 2 with a compressor 2a to which intake air 4 from an air cleaner 3 is fed through an intake pipe 5. The intake air 4 thus pressurized in the compressor 2a is fed to an intercooler 6 for cooling and is further introduced from the intercooler 6 to an intake manifold 7 where the intake air 4 is distributed to respective cylinders of the engine 1. Exhaust gas 8 discharged from the respective cylinders of the engine 1 is fed via an exhaust manifold 9 to a turbine 2b of the turbocharger 2. The exhaust gas 8 having driven the turbine 2b is discharged through an exhaust pipe 10 to outside of the vehicle.

Arranged between the engine 1 and a radiator 11 is a circulation passage 13 for circulation of cooling water 12 therebetween. In the circulation passage 13, the cooling water 12 having water-cooled the engine 1 and thus being increased in temperature is discharged to an outlet section 14 and is returned from the outlet section 14 through the radiator 11 to an inlet section 15.

The inlet section 15 to the engine 1 in the circulation passage 13 is provided with a thermostat 16 adapted to close the passage of the cooling water 12 returned from the radiator 11 to the inlet section 15; when the cooling water 12 is low in temperature, the thermostat 16 operates to close the passage for returning of the cooling water 12 from the radiator 11 to the engine 1 and open a bypass port 17 for communication between the inlet and outlet sections 15 and 14, so that warming of the engine 1 is prioritized by circulating the cooling water 12 not by way of the radiator 11.

In addition to an existing water-temperature sensor 18, a further water-temperature sensor 19 is arranged for detecting a temperature of the cooling water 12 having passed through the engine 1. Detections signals 18a and 19a of the water-temperature sensors 18 and 19 are inputted to a controller 20. In the controller 20, whether each of the detection values of the water-temperature sensors 18 and 19 is within a normal range or not is confirmed to make determination on alternative four Cases 1-4 in FIG. 2 and make determination on Case 5 in FIG. 2 even if each of the detection values of the water-temperature sensors 18 and 19 is within the normal range.

Specifically, the water-temperature sensors 18 and 19 can detect temperature by taking advantage of a fact that electric resistance in metallic oxides, semiconductor or the like varies depending upon temperature. As shown in the graph of FIG. 3, signal voltage in each of the normal water-temperature sensors 18 and 19, which varies depending on water temperature as shown in curve α, is within a normal range N between lower and upper limits A1 and A2. Detection of the signal voltage with a range lower than the lower limit A1 is regarded as abnormality due to ground short of a harness and that with a range higher than the upper limit A2 is regarded as abnormality due to breaking of wire in the harness or battery short.

The determinations on Cases 1-5 in the controller 20 will be detailed. Case 1 is a case where the detection value of the one water-temperature sensor 18 is employed as temperature of the cooling water 12 when each of the detection values of the water-temperature sensors 18 and 19 is within the normal range N and the condition of a below-mentioned Case 5 (a deflection between the detection values of the water-temperature sensors 18 and 19 exceeds a predetermined allowable value) is not met. Case 2 is a case where the detection value of the other water-temperature sensor 19 is employed as temperature of the cooling water 12 when the detection values of the one and the other of the water-temperature sensors 18 and 19 are out of and within the normal range N, respectively. Case 3 is a case where the detection value of the one water-temperature sensor 18 is employed as temperature of the cooling water 12 when the detection values of the one and the other of the water-temperature sensors 18 and 19 are within and out of the normal range N, respectively.

Further, Case 4 is a case where, when both of the detection values of the water-temperature sensors 18 and 19 are out of the normal range N, a fixed substitute value is employed as temperature of the cooling water 12 and a device causing any trouble by use of the substitute value is selectively stopped. In the embodiment, stopped is the EGR device 21 which recirculates the exhaust gas 8 (EGR gas) from the exhaust manifold 9 to the intake pipe 5 at a position near an inlet to the suction manifold 7.

Specifically, in the illustrated example shown in FIG. 1, the EGR device 21 comprises an EGR pipe 22 for connection between the exhaust manifold 9 and the intake pipe 5 near the inlet to the suction manifold 7, an EGR valve 23 adjustable in opening degree to properly control a recirculation amount of the exhaust gas 8, and a water-cooling EGR cooler 24 for cooling of the exhaust gas 8 to be recirculated. Thus, when both of the detection values of the water-temperature sensors 18 and 19 are out of a normal range N, the EGR valve 23 is kept closed by a control signal 23a from the controller 20 to thereby stop the recirculation of the exhaust gas 8.

Case 5 is a case where, if each of the detection values of the water-temperature sensors 18 and 19 is within the normal range N and a deflection between the detection values of the water-temperature sensors 18 and 19 exceeds a predetermined allowable value (see below-mentioned formula 1), a fixed substitute value is employed as temperature of the cooling water 12 and the device causing any trouble by use of the substitute value is selectively stopped. Just like the above-mentioned Case 4, stopped is the EGR device 21 which recirculates the exhaust gas 8 (EGR gas) from the exhaust manifold 9 to the intake pipe 5 near the inlet to the suction manifold 7.

[formula 1]

|detection value of water-temperature sensor 18−detection value of water-temperature sensor 19|≥allowable value     (1)

Thus, when each of the detection values of the water-temperature sensors 18 and 19 is within the normal range N and the deflection between the detection values of the water-temperature sensors 18 and 19 does not exceed the predetermined allowable value, both of the water-temperature sensors 18 and 19 are regarded to be normal, so that, by determination of Case 1 in the controller 20, the detection value of the one water-temperature sensor 18 can be employed, with no trouble, as temperature of the cooling water 12 to continue the control. When either of the detection values is a value out of the normal range N and impossible in the normal use, the water-temperature sensor 18 or 19 outputting the detection value is regarded abnormal, so that by determination of Case 2 or 3 in the controller 20, the remaining detection value of the water-temperature sensor 19 or 18 within the normal range N can be employed as temperature of the cooling water 12 to continue the control with causing no trouble.

For example, in a case of control where warming of the engine 1 is prioritized in a condition of the engine 1 being cold at cold start thereof (cold condition) with the operation of the EGR device 21 being stopped, it is possible that increase in temperature of the cooling water 12 having passed through the engine 1 up to a predetermined value is confirmed to determine completed warm-up of the engine 1 and open the EGR valve 23 by permitting the operation of the EGR device 21.

If both of the detection values of the water-temperature sensors 18 and 19 are out of the normal range N, both of the water-temperature sensors 18 and 19 are regarded abnormal, so that, by determination on Case 4 in the controller 20, both of the detection values are rejected and the fixed substitute value is employed as temperature of the cooling water 12 while a device causing any trouble by use of the substitute value is selectively stopped; e.g., the EGR valve 23 is kept closed to stop the operation of the EGR device 21.

The treatment by determination of Case 4 is similar to a conventional treatment where a single water-temperature sensor becomes abnormal. With respect to specifically trouble-free control, the fixed substitute value may be temporarily applied as temperature of the cooling water 12 to continue the control.

Further, if both of the detection values of the water-temperature sensors 18 and 19 are within the normal range N and the deflection between the detection values of the water-temperature sensors 18 and 19 exceeds the predetermined allowable value, then either of the water-temperature sensors 18 and 19 is regarded abnormal in characteristic, so that by determination on Case 5 in the controller 20, both of the detection values are rejected and the fixed substitute value is employed as temperature of the cooling water 12 while the device causing any trouble by use of the substitute value is selectively stopped; e.g., the EGR valve 23 is kept closed to stop the operation of the EGR device 21. The treatment by determination on Case 5 is the same as the above-mentioned treatment by determination on Case 4.

Thus, according to the above embodiment, even if one of the water-temperature sensors 18 and 19 becomes abnormal, the other of the water-temperature sensors 19 and 18 can make backup to continuously grasp the temperature of the cooling water 12, so that the control depending upon the temperature of the cooling water 12 can be continued with causing no trouble; as a result, the EGR device 21 or other device can be operated normally for a long time until both of the water-temperature sensors 18 and 19 become abnormal. When both of the water-temperature sensors 18 and 19 become abnormal, the fixed substitute value can be employed as temperature of the cooling water 12 to continue specifically trouble-free control; any troubles due to malfunctions of the device operating depending upon the temperature of the cooling water 12, e.g., generation of white smoke due to started recirculation of the exhaust gas 8 to the unwarmed engine 1 at cold start thereof can be preliminarily prevented.

Further, abnormality of either of the water-temperature sensors 18 and 19 can be detected even if both of the water-temperature sensors 18 and 19 are within the normal range N. Thus, also when such abnormality in characteristic is detected, the fixed substitute value can be employed as temperature of the cooling water 12 to continue specifically trouble-free control, and any troubles due to malfunctions of the device operating depending upon the temperature of the cooling water 12 (for example, trouble such as generation of white smoke due to started recirculation of the exhaust gas 8 to the unwarmed engine 1 at cold start thereof just like mentioned in the above) can be preliminarily prevented.

It is to be understood that a water-temperature-sensor backup system according to the invention is not limited to the above embodiment and that various changes and modifications may be made without departing from the scope of the invention. For example, in the illustrated embodiment, the EGR device is exemplified as a device operating in dependence upon temperature of cooling water; however, the invention is similarly applicable to a device other than the EGR device in dependence upon temperature of the cooling water.

REFERENCE SIGNS LIST 1 engine
12 cooling water
18 water-temperature sensor
18a detection signal
19 water-temperature sensor
19a detection signal

20 controller
21 EGR device (device)

The invention claimed is:

1. A water-temperature-sensor backup system comprising:

two water-temperature sensors, each water-temperature sensor detects a temperature of cooling water having passed through an engine; and a controller configured to determine whether each of detection values of said water-temperature sensors is within a normal range and then employ either of the detection values as temperature of the cooling water, wherein, even if either one of the detection values of the water-temperature sensors is out of the normal range, the controller is configured to employ the remaining detection value that is within the normal range as temperature of the cooling water, and wherein, if each of the detection values of the water-temperature sensors is within the normal range and a deflection between said detection values exceeds an allowable value, then the controller is configured to employ a fixed substitute value as temperature of the cooling water and stop operation of a device causing any trouble due to use of said fixed substitute value.

2. The water-temperature-sensor backup system as claimed in claim 1, wherein, if both of the detection values of the water-temperature sensors are out of the normal range, the controller is configured to employ the fixed substitute value as temperature of the cooling water, and wherein the controller is configured to selectively stop operation of the device causing any trouble due to use of the substitute value.

* * * * *